(12) United States Patent
Asano

(10) Patent No.: US 7,881,187 B2
(45) Date of Patent: Feb. 1, 2011

(54) TRANSMISSION APPARATUS

(75) Inventor: Hiroyuki Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 11/657,657

(22) Filed: Jan. 25, 2007

(65) Prior Publication Data

US 2008/0037581 A1     Feb. 14, 2008

(30) Foreign Application Priority Data

Aug. 9, 2006     (JP) ............................. 2006-216908

(51) Int. Cl.
*H04J 3/14*     (2006.01)
(52) U.S. Cl. ..................... 370/217; 370/466; 370/474
(58) Field of Classification Search ................ 370/351, 370/389, 395.1, 395.5, 464, 465, 466, 469, 370/216, 217, 218, 474; 398/75
See application file for complete search history.

(56) References Cited

U.S. PATENT DOCUMENTS

| | | | |
|---|---|---|---|
| 5,138,614 A * | 8/1992 | Baumgartner et al. ....... | 370/261 |
| 6,631,130 B1 | 10/2003 | Roy et al. | |
| 6,731,876 B1 * | 5/2004 | Okamoto et al. .............. | 398/75 |
| 6,999,413 B2 * | 2/2006 | Moriwaki et al. ........... | 370/228 |
| 2001/0012288 A1 * | 8/2001 | Yu .............................. | 370/352 |
| 2003/0128712 A1 * | 7/2003 | Moriwaki et al. ........... | 370/412 |
| 2006/0274734 A1 * | 12/2006 | DeMartino .................. | 370/352 |

FOREIGN PATENT DOCUMENTS

| | | |
|---|---|---|
| JP | 2004-519123 | 6/2004 |
| WO | WO 02/43302 | 5/2002 |

* cited by examiner

*Primary Examiner*—Kwang B Yao
*Assistant Examiner*—Obaidul Huq
(74) *Attorney, Agent, or Firm*—Staas & Halsey LLP

(57) ABSTRACT

The present invention provides a transmission apparatus including transmitting side line interfaces which convert packet format data sent from an asynchronous network to a SONET/SDH frame format and then transmit the data, multiple receiving side line interfaces which receive the SONET/SDH frame format data and convert the data to packet format data and a circuit switching section which performs circuit switching. The transmitting side line interfaces include a variable length frame mapping section which converts the packet format data to variable length frame format data and a time division multiplexing mapping section which converts the variable length frame format data to the SONET/SDH frame format data. The receiving side line interfaces include a variable length frame demapping section which reconverts the SONET/SDH frame format data to variable length frame format data.

8 Claims, 16 Drawing Sheets

TRANSMISSION APPARATUS

CROSS REFERENCE TO RELATED APPLICATIONS

This application claims the benefit under 35 U.S.C. Section 119, of Japanese Patent Application No. 2006-216908, filed Aug. 9, 2006, which is hereby incorporated by reference in its entirety into this application.

BACKGROUND OF THE INVENTION

1. Field of the Invention

The present invention relates to a transmission apparatus, and more particularly, to a transmission apparatus which accommodates an asynchronous network and a SONET/SDH network.

2. Description of the Related Art

As a conventional transmission network, a synchronous network under a SONET/SDH scheme specified in SONET (Synchronous Optical Network) which is an ANSI (American National Standards Institute) standard or in SDH (Synchronous Digital Hierarchy) of ITU Recommendation is widely used. Data transmission over this SONET/SDH network secures a congestion-free fixed bandwidth. On the other hand, with the widespread use of the Internet in recent years, there is a growing trend to convert telephone voice data to IP (Internet Protocol) packets and transmit the data asynchronously through a router, that is, "IP implementation" and there is a growing demand for this packet transmission over a transmission network. Therefore, a router function is being incorporated into a transmission apparatus which accommodates a SONET/SDH network.

FIG. 16 is a block diagram showing a configuration of a conventional transmission apparatus.

A transmission apparatus 900 shown in FIG. 16 is constructed of an IP router section 910 which transmits an IP packet and a SONET ADM (Add Drop Multiplexer) 920 which switches between SONET frames. The IP router section 910 is provided with a switch, that is, a packet switch system (Packet Switch System) 911 which switches paths and a packet processing section (Packet Processing) 912 and the SONET ADM 920 is provided with a switch system (Switch System) 921 and a line interface (Line Interface) 922. This transmission apparatus 900 can switch both SONET frame format data and packet format data. However, in the transmission apparatus 900, a switch function is provided for each of the IP router section 910 and SONET ADM 920, and the switch function is required to achieve commonality from the standpoint of efficiency. To allow commonality of the switch function here, there may be a method of performing switching after converting SONET frame format data to a packet format. However, packet switching cannot avoid fluctuations in a transmission time and data buffering is required to absorb these fluctuations. Therefore, it is difficult to realize a large-capacity transmission apparatus because the problem of delays due to buffering becomes serious with such a transmission apparatus.

Here, National Publication of International Patent Application No. 2004-519123 discloses a scheme whereby packet format data is mapped to a time division multiplexing frame format which is defined by SONET and data in respective time division multiplexing, packet and ATM (Asynchronous Transfer Mode) formats are thereby switched using a common switch function.

However, the scheme described in National Publication of International Patent Application No. 2004-519123 subdivides packet data into 52-byte fixed length frames as defined in ATM and then performs mapping, and loss is thereby produced due to overhead generated every 52-byte fixed length frame and insertion of data to fill the blanks of fixed length frames, which suppresses transmission bandwidths.

The present invention has been made in view of the above circumstances and provides a transmission apparatus which suppresses transmission loss.

SUMMARY OF THE INVENTION

The transmission apparatus according to the present invention is a transmission apparatus which accommodates multiple asynchronous networks and SONET/SDH networks, including multiple transmitting side line interfaces which convert packet format data sent from the above asynchronous networks to a SONET/SDH frame format which is a time division multiplexing frame format and then transmit the data, multiple receiving side line interfaces which receive the SONET/SDH frame format data and convert at least part of the received data to packet format data, a SONET/SDH network interface which relays the SONET/SDH network, and a circuit switching section which sends/receives SONET/SDH frame format data between the SONET/SDH network interface, the multiple transmitting side line interfaces and the multiple receiving side line interfaces and switches circuits between the SONET/SDH network interface, the multiple transmitting side line interfaces and the multiple receiving side line interfaces based on a predetermined circuit setting, wherein each of the multiple transmitting side line interfaces includes a variable length frame mapping section which converts packet format data to predetermined variable length frame format data and a time division multiplexing mapping section which converts the variable length frame format data converted by the variable length frame mapping section to SONET/SDH frame format data, each of the multiple receiving side line interfaces includes a variable length frame demapping section which reconverts the SONET/SDH frame format data to variable length frame format data, and a packet data configuration section which converts the variable length frame format data reconverted by the variable length frame conversion section to packet format data.

Here, the SONET/SDH frame format means a frame format defined by SONET which is an ANSI standard or SDH of the ITU Recommendation. According to the transmission apparatus according to the invention, packet format data is converted to variable length frame format data first and is then converted to SONET/SDH frame format data. Therefore, according to the invention, transmission loss is suppressed compared to the configuration whereby packet format data is subdivided into fixed length frames.

Here, in the above transmission apparatus according to the invention, each of the above multiple transmitting side line interfaces is preferably provided with multiple buffers which buffer the data sent in the packet format for each type of this data and a reading section which reads data with a frequency according to each buffer from the multiple buffers and supplies the data to the above variable length frame mapping section.

Since data is buffered in multiple buffers for each type of data and is read with a frequency according to each buffer, when, for example, a type of data having small delay allowance such as voice data is mixed, it is possible to keep service quality (QoS) through delay control according to the type of data.

Furthermore, in the above transmission apparatus according to the invention, when a fault occurs in any one of the above multiple receiving side line interfaces, it is preferable to include a fault handling control section which causes the transmitting side line interface which converts the data transmitted to the receiving side line interface in which the fault has occurred out of the above multiple transmitting side line interface to stop data conversion to the SONET/SDH frame format and buffer the packet format data sent to this transmitting side line interface.

When a fault occurs in a receiving side line interface, it is possible to prevent data omissions and suppress degradation of transmission quality by stopping data conversion at a transmitting side line interface and buffering the data.

Furthermore, in the above transmission apparatus according to the invention, the above circuit switching section is preferably set to a mesh connection whereby multiple logical data paths which are formed when multiple types of data are multiplexed in a SONET/SDH frame at each of the above multiple transmitting side line interfaces are distributed to the above multiple receiving side line interfaces and each of the above multiple transmitting side line interfaces preferably selects a logical data path through which data is allowed to pass out of the above multiple logical data paths so as to select a receiving side line interface which receives this data out of the above multiple receiving side line interfaces.

The circuit switching section fixes the distribution of logical data paths and the transmitting side line interface selects a logical data path through which data is allowed to pass, and in this way the switching setting at the circuit switching section is not dynamically changed, and it is thereby possible to speed up data transmission.

Furthermore, in the above transmission apparatus according to the invention, the above circuit switching section preferably duplicates at least one type of data out of multiple types of data multiplexed in a SONET/SDH frame and transmits this duplicated data to a receiving side line interface according to a predetermined circuit setting out of the above multiple receiving side line interfaces.

The circuit switching section duplicates and transmits data, and can thereby realize multicasting of the SONET/SDH frame at a payload level.

Furthermore, in the above transmission apparatus according to the invention, at least one transmitting side line interface out of the above multiple transmitting side line interfaces preferably duplicates the packet format data sent and converts the data to a SONET/SDH frame format together with the packet format data which has been sent.

The transmitting side line interface duplicates data and then transmits the data, and can thereby realize multicasting at a packet level.

Furthermore, in the above transmission apparatus according to the invention, the above variable length frame mapping section preferably converts packet format data to GFP frame format data defined by the ITU Recommendation G.7041 as a variable length frame format.

Furthermore, in the above transmission apparatus according to the invention, the above reading section preferably reads data from the above multiple buffers according to a schedule using a weighted round robin method whereby data is read with a higher frequency from a buffer with higher priority assigned.

Furthermore, in the above transmission apparatus according to the invention, the above reading section preferably reads data by giving first priority to a buffer which buffers voice data out of the above multiple buffers.

As described above, the invention realizes a transmission apparatus that suppresses transmission loss.

DETAILED DESCRIPTION OF THE INVENTION

With reference now to the attached drawings, an embodiment of the transmission apparatus according to the invention will be explained below.

[Overall Configuration of Transmission Apparatus]

Figure 1:
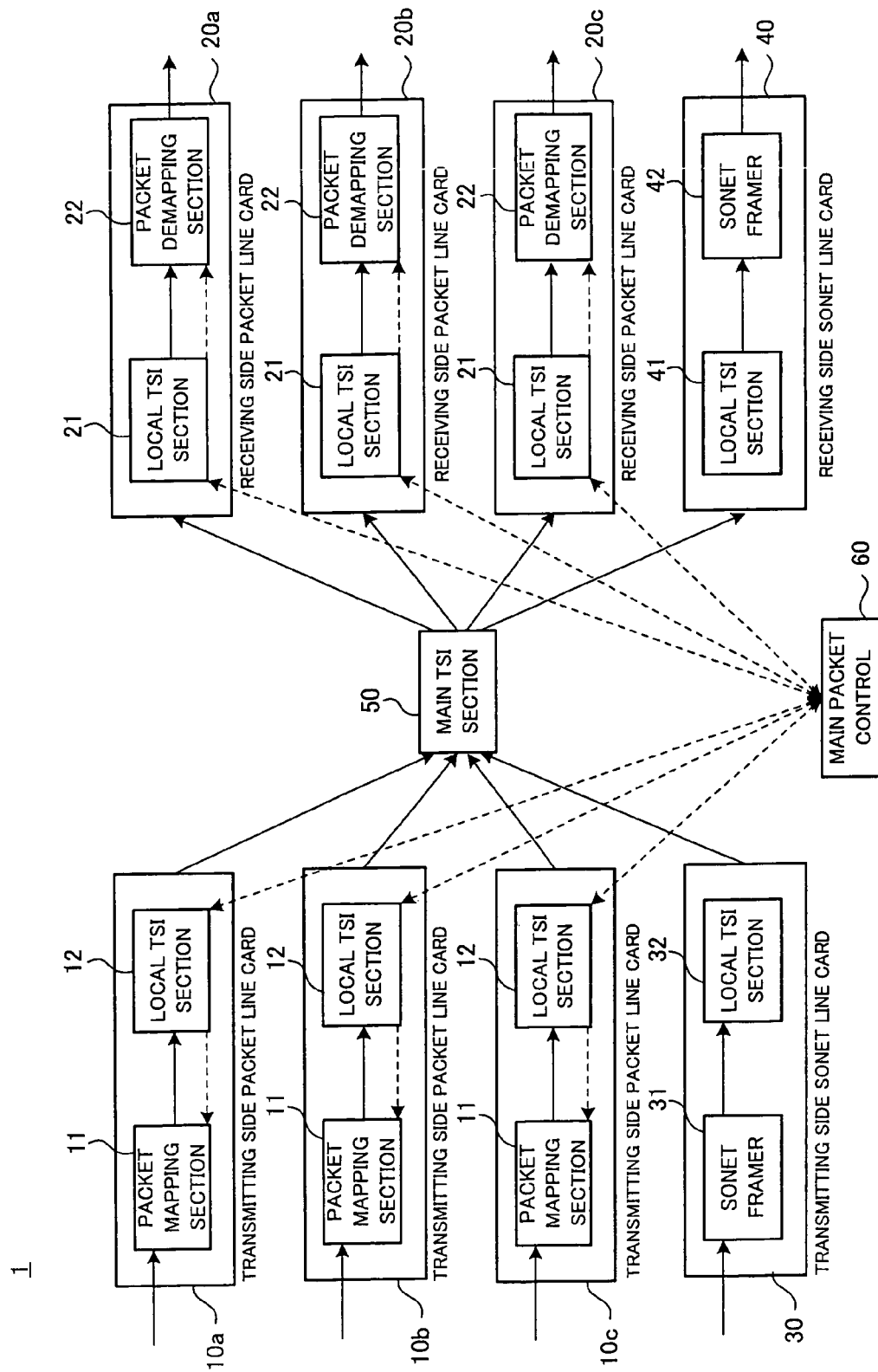
FIG. 1 is a block diagram showing an embodiment of a transmission apparatus according to the invention.

FIG. 1 is a block diagram showing an embodiment of the transmission apparatus according to the invention. Of SONET and SDH, SONET will be explained as a representative in this embodiment.

A transmission apparatus 1 shown in FIG. 1 is a transmission apparatus which accommodates an IP packet network which is an asynchronous network and a SONET network and provided with transmitting side packet line cards (Packet Line Cards) 10 (10a, 10b, 10c), receiving side packet line cards (Packet Line Cards) 20 (20a, 20b, 20c), a transmitting side SONET line card (Line Card) 30, a receiving side SONET line card (Line Card) 40, a main time slot interchange 50 (Main Time Slot Interchange; hereinafter abbreviated as "main TSI section 50") which performs circuit switching and a main packet control section (Main Packet control section) 60. The Main TSI section 50 is common to the asynchronous network and the SONET network. In FIG. 1, arrows of solid line indicate flows of data and arrows of broken line indicate control.

The transmitting side packet line cards 10a, 10b and 10c are connected through Ethernet (hereinafter, registered trademark) to multiple IP routers and computer terminals (not shown) which make up an IP packet network, convert IP (Internet Protocol) packet format data sent from these IP routers or the like to SONET frame format data and transmit it to the main TSI section 50. The transmitting side packet line cards 10a, 10 b and 10c are each provided with a packet mapping section 11 which converts IP packet format data to data in an STS-1 basic frame format which is a basic transmission format in the SONET/SDH frame format and a local TSI section 12 which time division multiplexes data in basic frame formats of multiple types into a multiplexing frame format such as STS-192 of SONET to thereby generate multiplexed data.

The receiving side packet line cards 20a, 20b and 20c are each provided with a local TSI section 21 which separates the basic frame format data from data multiplexed into a multiplexing frame format of SONET/SDH sent from the main TSI section 50 and a packet demapping section 22 which converts the separated data to IP packet format data and outputs it to the IP routers or the like through Ethernet, and convert the SONET/SDH frame format data to packet format data and transmit it to the externally connected IP routers or the like.

The transmitting side SONET line card 30 and the receiving side SONET line card 40 relay data via the main TSI section 50 and SONET/SDH network. The transmitting side SONET line card 30 is provided with a SONET framer 31 which receives an optical signal defined in OC-192 (Optical Carrier level-192) and OC-48 or the like of SONET, performs signal conversion between optical signal and electric signal, detects a frame boundary, performs overhead processing and extracts payload data and a local TSI section 32 which time division multiplexes the extracted data into a predetermined time slot to thereby generate multiplexed data and transmits it to the main TSI section 50. On the other hand, the receiving side SONET line card 40 is provided with a local TSI section 41 which demultiplexes the multiplexed data received from the main TSI section 50 and a SONET framer 42 which gives overhead to the demultiplexed data and reconverts it to an optical signal having a frame format such as OC-48. The transmitting side SONET line card 30 and the receiving side SONET line card 40 function as a publicly known SONET transmission apparatus together with the main TSI section 50.

The main TSI section 50 is connected to the transmitting side packet line cards 10a to 10c, the receiving side packet line cards 20a to 20c, the transmitting side SONET line card 30 and the receiving side SONET line card 40, receives the SONET/SDH multiplexing frame format data from the transmitting side packet line cards 10a, 10b and 10c and transmitting side SONET line card 30, performs switching on the multiplexed data and transmits it to a specific card out of the receiving side packet line cards 20a, 20b and 20c and the receiving side SONET line card 40. The switch of the main TSI section 50 performs circuit switching between the transmitting side packet line cards 10a, 10b and 10c, the receiving side packet line cards 20a, 20b and 20c, the transmitting side SONET line card 30 and the receiving side SONET line card 40. Circuit switching is performed based on a circuit setting by the main packet control section 60. The main TSI section 50 is designed to be able to process the data of all the connected cards (10a to 10c, 20a to 20c, 30, 40) simultaneously and an example of the transmission apparatus 1 has a switch capacity of 160 Gbps so that each of all the cards connected to the main TSI section 50 can use a transmission bandwidth of a 20 Gbps maximum.

Here, the transmitting side packet line card 10 corresponds to an example of the transmitting side line interface described in the invention and the receiving side packet line card 20 corresponds to an example of the receiving side line interface described in the invention. Furthermore, the main TSI section 50 corresponds to an example of the circuit switching section described in the invention and the transmitting side SONET line card 30 and the receiving side SONET line card 40 correspond to examples of the SONET/SDH network interface.

[Transmitting Side Packet Line Card]

Figure 2:
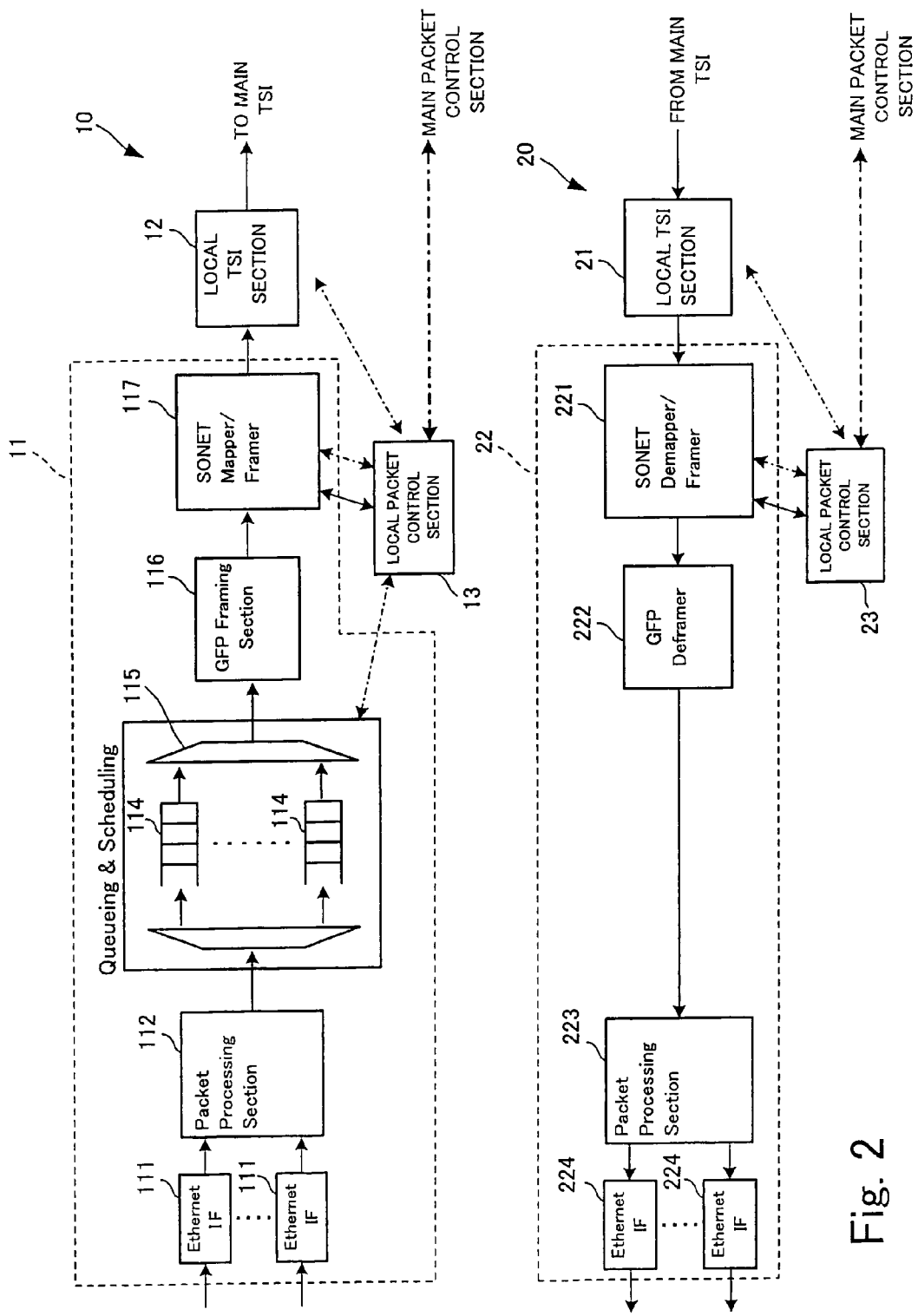
FIG. 2 is a block diagram showing a configurations of a transmitting side packet line card and a receiving side line card shown in FIG. 1.

FIG. 2 is a block diagram showing the configurations of the transmitting side packet line card and the receiving side line card which are shown in FIG. 1. FIG. 2 shows one of the transmitting side packet line cards 10a, 10b and 10c and one of the receiving side line cards 20a, 20b and 20c with reference numerals 10 and 20 assigned thereto respectively.

The packet mapping section 11 of the transmitting side packet line card 10 shown in FIG. 2 is provided with multiple Ethernet IFs 111, a packet processing section (Packet Processing) 112, multiple buffers 114, a reading section 115, a GFP framing section 116 and a SONET mapper/framer (SONET Mapper/Framer) 117. Furthermore, the transmitting side packet line card 10 is also provided with a local packet control section 13 which acquires information on a packet from each section in the packet mapping section 11, local TSI section 12 and main packet control section 60 (see FIG. 1) and controls the reading section 115, the SONET mapper/framer 117 and the local TSI section 12 according to this information. Here, the GFP framing section 116 corresponds to an example of the variable length frame mapping section described in the invention and the SONET mapper/framer 117 and the local TSI section 12 correspond to examples of the time division multiplexing mapping section described in the invention.

The Ethernet IF 111 carries out termination processing of an Ethernet physical layer and MAC (Media Access Control) layer on the data sent through Ethernet from outside the transmission apparatus 1 and extracts IP packet format data which is a payload from an Ethernet frame. One transmitting side packet line card 10 is provided with multiple Ethernet IFs 111 and each functions as one port.

The packet processing section 112 monitors whether or not the amount of data received from the Ethernet IF 111 exceeds a predetermined upper limit. Furthermore, the packet processing section 112 reads header information of an IP packet extracted by the Ethernet IF 111, distinguishes the type of the IP packet such as VLAN, L2, IPv4, IPv6, MPLS from the header information and determines the destination of the packet with reference to a routing table. More specifically, the packet processing section 112 determines address card information indicating a specific receiving side packet line card 20 and address port information indicating a specific receiving side Ethernet IF 224 in the address card. Furthermore, the packet processing section 112 distinguishes priority as one of the types of data from the header information. For example, it divides priority of service quality (QoS: Quality of Service) provided by the transmission apparatus 1 into four levels and distinguishes to which priority level a transmitted IP packet belongs. For example, voice data by VoIP (Voice over IP) is classified as a top priority level. The packet format data is buffered in multiple FIFO buffers 114 provided according to the division of priority. One of the multiple buffers 114 functions as a virtual output queue to temporarily buffer data sent from outside in the event of a fault.

The reading section 115 reads data from the multiple buffers 114 in predetermined order. The reading section 115 makes the rounds of the respective buffers 114 and reads data according to a schedule based on a weighted round robin (WRR) method in such a way that data in a buffer assigned higher priority is read with a higher frequency. This suppresses transmission fluctuations and delays of data with high priority. The read packet format data is supplied to the GFP framing section 116.

The GFP framing section 116 converts the packet format data read by the reading section 115 to variable length frame format data. As the variable length frame format, a GFP (General Framing Procedure) frame defined in the ITU Recommendation G.7041 is adopted. The GFP also corresponds to data in various formats defined in Ethernet, fiber channel (FC), RPR (IEEE802.17), ESCON and FICON in addition to the IP packet format data.

[GFP Frame Structure]

Figure 3:
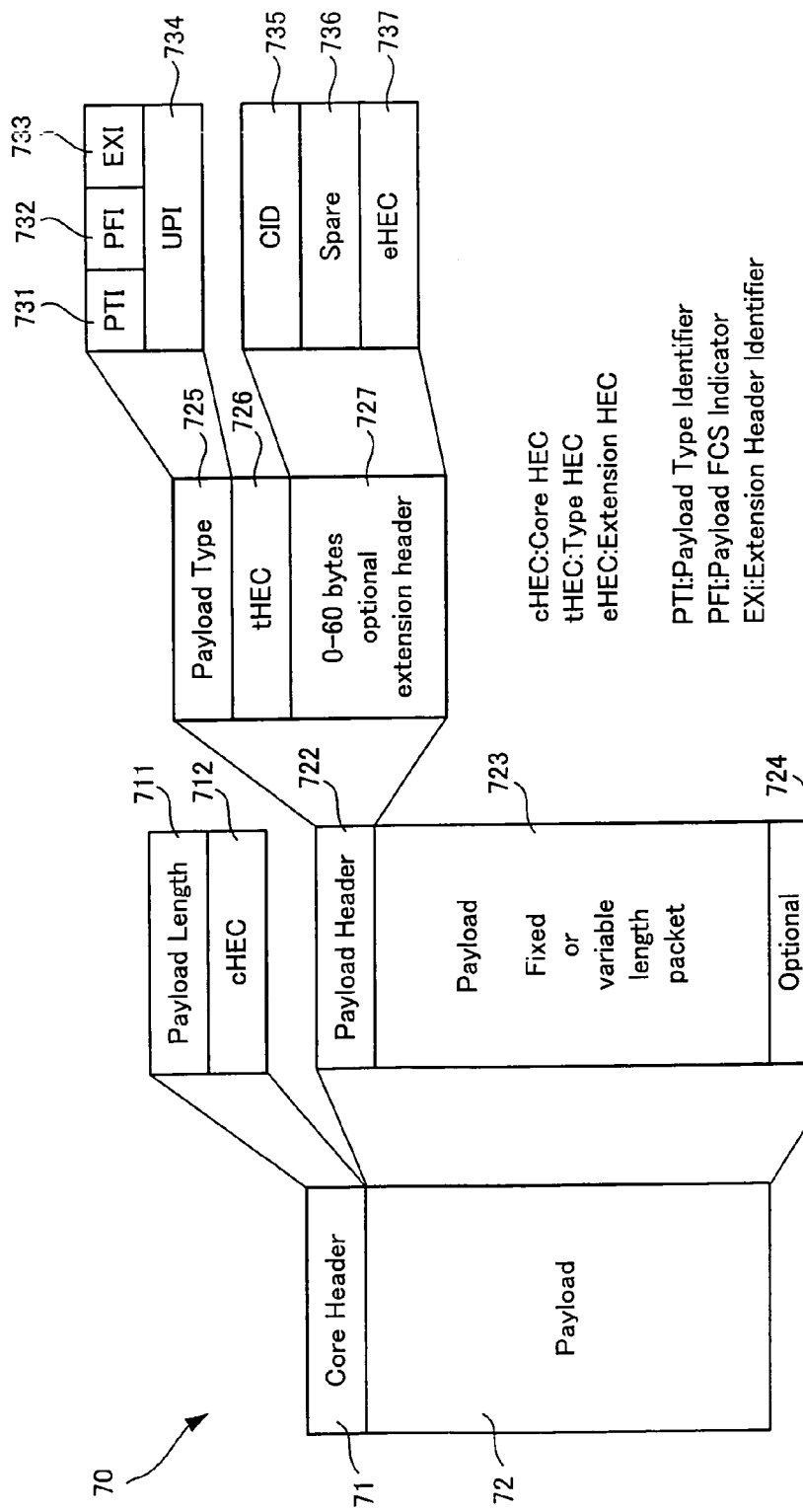
FIG. 3 illustrates a GFP frame structure.

FIG. 3 illustrates a GFP frame structure.

One GFP frame 70 is made up of a core header (Core Header) 71 and a payload (Payload) 72. The core header 71 is made up of a payload length (Payload Length) 711 indicating the length of the payload and a core header error control field (core Header Error Control; cHEC) 712 for error detection. On the other hand, the payload 72 is made up of a payload header (Payload Header) 722, a payload body (Payload) 723 and a frame check sequence (FCS) 724 for error detection, and among them, the payload header 722 is made up of a payload type (Payload Type) 725, a type header error control field (tHEC) 726 for error detection and an extension header as an option (optional extension header) 727. Moreover, the payload type 725 is made up of a payload type identifier (PTI) 731, a payload FCS indicator (PFI) 732, an extension header identifier (EXI) 733 and a user payload identifier (UPI), while the extension header 727 is made up of a channel identifier (CID) 735, spare data 736 and an extension header error control field (eHEC) 737.

The GFP framing section 116 (see FIG. 2) maps the packet format data to the GFP frame. More specifically, the GFP framing section 116 places 1-packet data in the payload 723, sets the payload length 711 as the length of the packet and inserts the necessary identifier shown in FIG. 3. Since the GFP frame 70 is a variable length frame, the packet format data is not subdivided.

Returning now to FIG. 2 to continue the explanation, the SONET mapper/framer 117 maps the data mapped to the GFP frame to the SONET frame.

Figure 4:
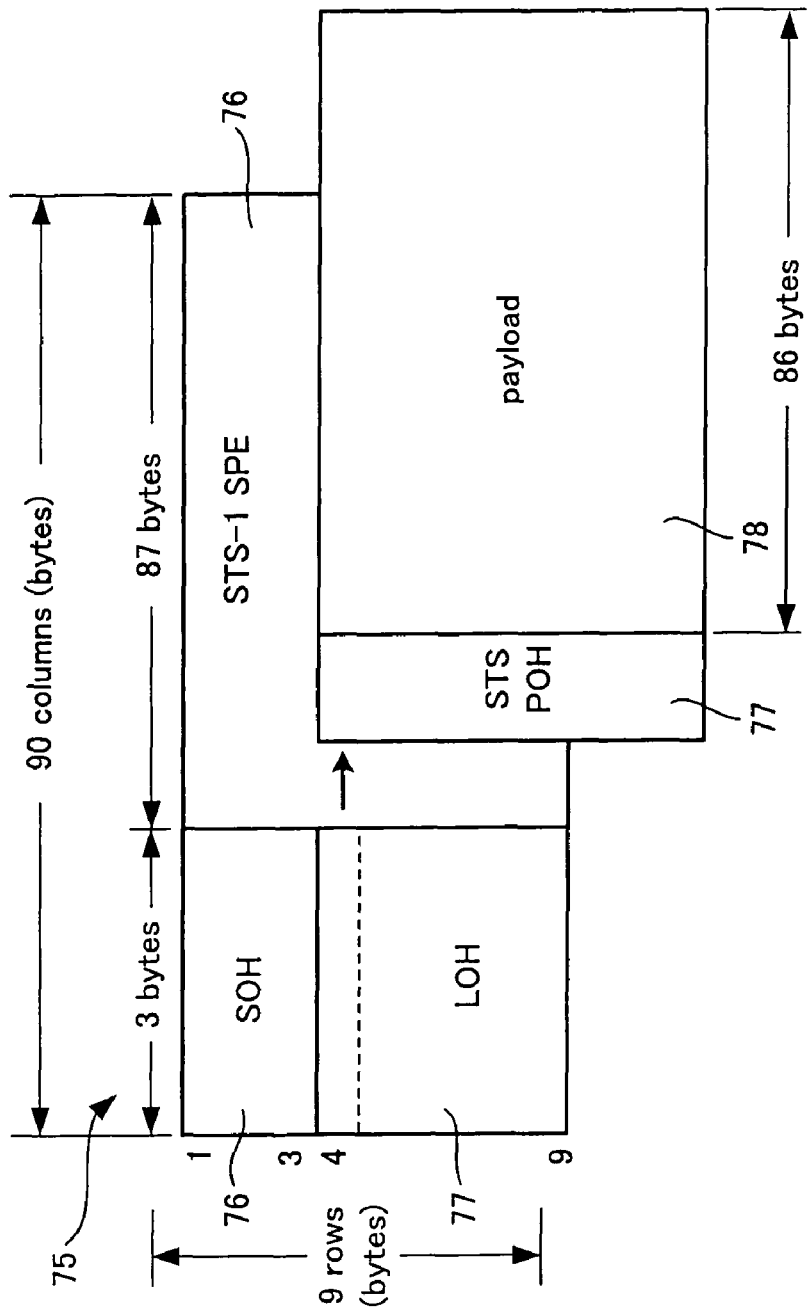
FIG. 4 illustrates an STS-1 frame structure of SONET.

FIG. 4 illustrates an STS-1 frame structure of SONET.

FIG. 4 shows the structure of a synchronous transfer signal level 1 (STS-1) frame which is a basic transmission frame defined by SONET as an example of the SONET/SDH frame format. The STS-1 frame 75 has a configuration of 90 bytes×9 rows=810 bytes and is made up of section overhead (SOH) 76, line overhead (LOH) 77 and synchronous payload envelope (STS-1SPE) 76. The STS-LSPE 76 is further made up of path overhead (POH) 77 and payload (Payload) 78. The STS-1 frame 75 is a basic transmission unit in SONET and corresponds to a transmission rate of 51.1 Mbps when transmitted in a 125-μS period. The SONET mapper/framer 117 (see FIG. 2) maps the GFP frame format data to the payload 78. When the SONET mapper/framer 117 maps the data to the payload 78, it is not necessary to give the transmission address information to the payload 78.

The local TSI section 12 shown in FIG. 2 generates a multiplexed frame of SONET by time division multiplexing multiple mapped basic frames. For example, in an STS-192 which realizes a transmission rate 192 times that of the STS-1 (see FIG. 4), 192 STS-1 frames are interleaved in byte units and transmitted 192 times faster. The transmission rate at this time reaches 9.953 Gbps, which means that STS-1 frames corresponding to 192 channels are transferred. The local TSI section 12 arranges the data of the basic frame to which packet data is mapped in the time slot corresponding to the data transmission destination out of the STS-192 and transmits it to the main TSI section 50. The time slot in which the basic frame is arranged is controlled by the local packet control section 13.

Note that SONET also defines a technique of virtual tributary (VT) which efficiently transmits a signal having a transmission capacity smaller than 51.1 Mbps by further subdividing the payload of the STS-1 which is a basic transmission unit as opposed to the above multiplexing, but detailed explanations thereof will be omitted here. Furthermore, SDH adopts a frame format having a structure substantially identical to that of SONET and the STM-1 which is the basic transmission unit of SDH corresponds to the STS-3 of SONET.

Here, the SONET mapper/framer 117 and the local TSI section 12 perform mapping and multiplexing of data in three modes according to the setting.

Figure 5:
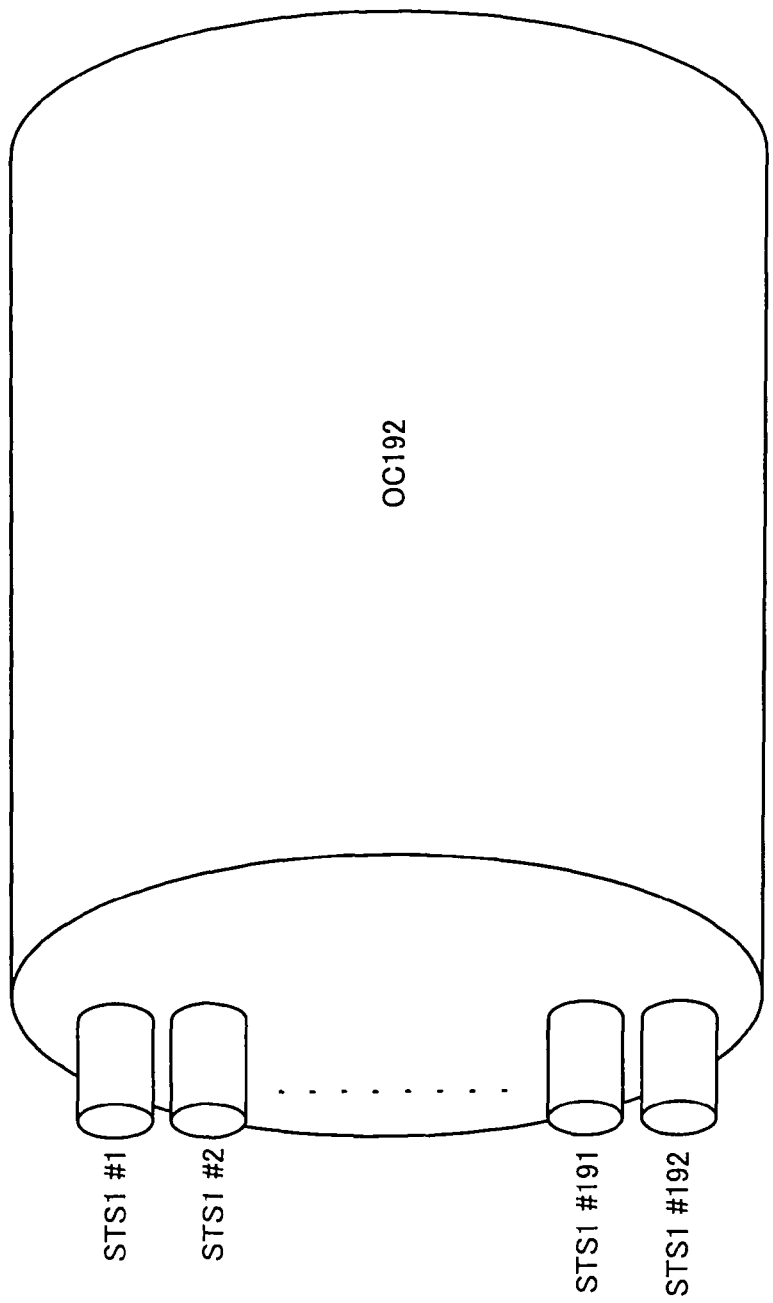
FIG. 5 illustrates an image of data transmission in a basic mode.

FIG. 5 shows an image of data transmission in a basic mode.

FIG. 5 shows an image of data transmission at an OC-192 (Optical Carrier level-192) of SONET which corresponds to the STS-192. During data transmission in this basic mode, the OC-192 multiplexes STS-1 signals corresponding to 192 channels from STS-1#1 to STS-1#192 and transmits the signal. In FIG. 5, a signal of each channel is transmitted from one port to another one. A pipe representing each channel is called a "logical data path."

The SONET mapper/framer 117 supports a continuous concatenation mode in addition to the basic mode. In the continuous concatenation mode, an STS-3C which maps data to, for example, three continuous multiplexed bytes transmit packet data at a transmission rate three times that of the STS-1.

Figure 6:
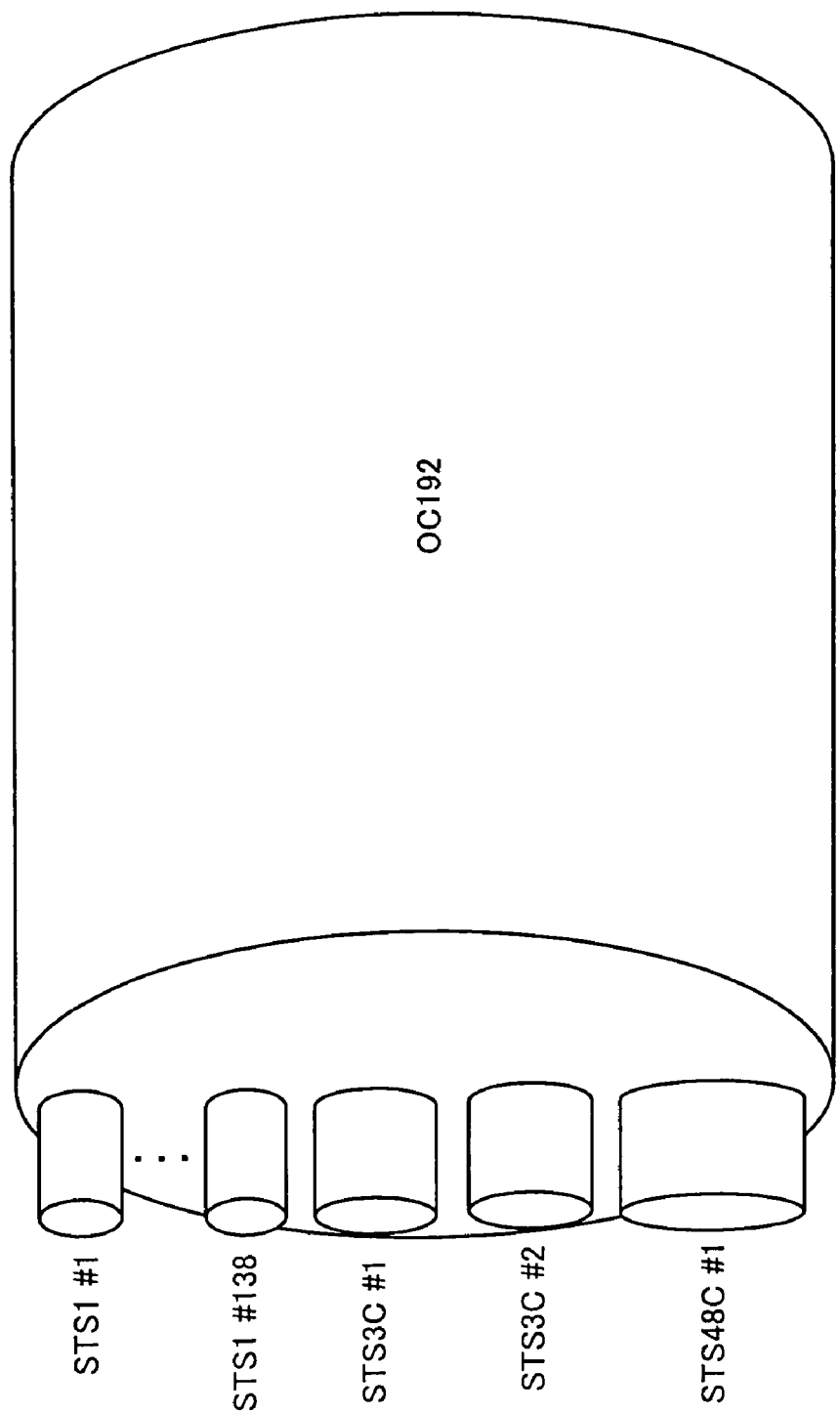
FIG. 6 illustrates an image showing an example of data transmission in a continuous concatenation mode.

FIG. 6 shows an image of an example of data transmission in the continuous concatenation mode.

In the continuous concatenation mode shown in FIG. 6, signals STS3C#1 of 155.52 Mbps in continuous concatenation and signals STS3C#2 and STS48C of 2488.32 Mbps in addition to STS-1 corresponding to 138 channels from STS-1#1 to STS-1#138 are multiplexed and transmitted at the transmission rate of the OC-192.

Furthermore, the SONET mapper/framer 117 also has a virtual concatenation mode which supports virtual concatenation (VC) of the ITU Recommendation. In the virtual concatenation mode, multiple independent STS-1s are virtually bundled to make up one logical data path.

Figure 7:
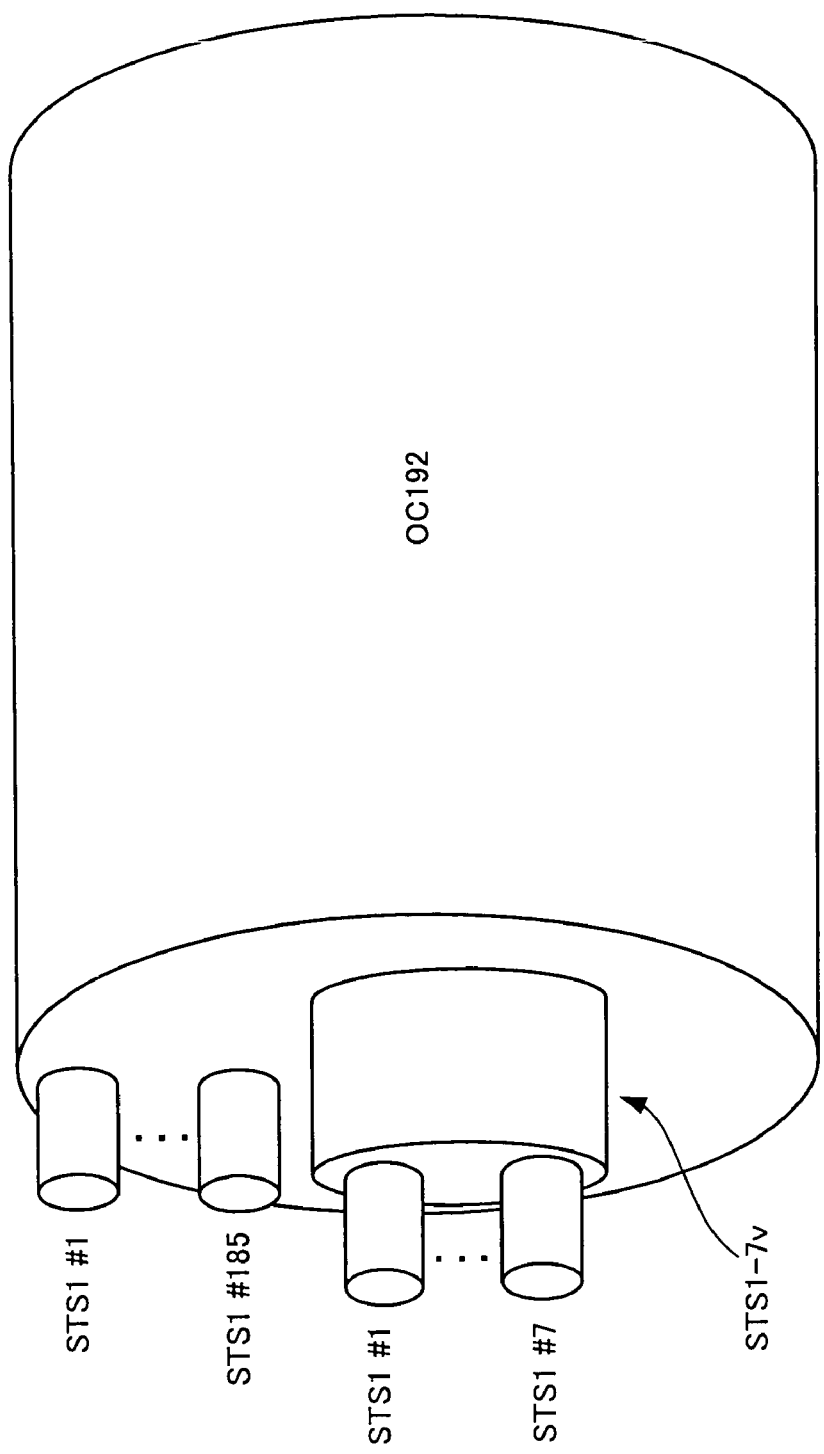
FIG. 7 illustrates an image showing an example of data transmission in a virtual concatenation mode.

FIG. 7 shows an image of a data transmission example in the virtual concatenation mode.

In the continuous concatenation mode shown in FIG. 7, an STS1-7v signal obtained by virtually bundling STS-1 signals corresponding to seven channels in addition to the STS-1 corresponding to 185 channels from STS-1#1 to STS-1#185 are multiplexed and transmitted at the transmission rate of the OC-192. The STS1-7v realizes a transmission rate of 357 Mbps. Furthermore, it is also possible to efficiently transmit data transmitted through giga-bit Ethernet by making up a logical data path of, for example, a virtual STS1-21v (1088 Mbps) (not shown).

[Receiving Side Packet Line Card]

Returning to FIG. 2, the receiving side packet line card 20 will be explained. The receiving side packet line card 20 consists of a local TSI section 21 which receives multiplexing frame format data of SONET/SDH from the main TSI section 50 and demultiplexes the data and a packet demapping section 22. The packet demapping section 22 is provided with a SONET demapper 221 which extracts a GFP frame as a payload from the demultiplexed SONET/SDH basic frame format data, a GFP deframer 222 which extracts an IP packet from the GFP frame extracted from the SONET demapper 221, a receiving side packet processing section (Packet Processing) 223 which adjusts the transmission rate of the extracted IP packet and multiple receiving side Ethernet IFs (Ethernet IFs) 224 which perform processing of Ethernet MAC layers and physical layers on IP packets and transmits them to the externally connected routers or the like through Ethernet. Furthermore, the receiving side packet line card 20 is provided with a receiving side local packet control section 23 which acquires information from the main packet control section 60 (see FIG. 1) and controls each section in the local TSI section 21 and the packet demapping section 22 according to the information acquired. Here, the receiving side packet line card 20 transmits the data which has been transmitted through fixed bandwidth to an asynchronous network in a packet format, and thereby requires no buffer for buffering the IP packet format data for each packet unlike the transmitting side packet line card 10. Therefore, the receiving side packet processing section 223 is provided with only a small capacity buffer to adjust the transmission rate. Here, the local TSI section 21 and the SONET demapper 221 correspond to an example of the variable length frame demapping section described in the invention and the GFP deframer 222 corresponds to an example of the packet data configuration section described in the invention.

[Main TSI Section]

Returning to FIG. 1 here, the main TSI section 50 will be explained. The main TSI section 50 receives SONET/SDH multiple frame format multiplexed data outputted from the transmitting side packet line card 10 and the transmitting side SONET line card 30, switches between paths through which data is transmitted based on the circuit setting, distributes and transmits the data to the receiving side packet line cards 20 and the receiving side SONET line card 40. Circuit switching is performed between the transmitting side packet line cards 10, the transmitting side SONET line card 30, the receiving side packet line cards 20 and the receiving side SONET line card 40 through switching between paths based on this circuit setting.

In this way, circuit switching as the transmission apparatus 1 is realized in a stage in which the local TSI section 12 of the transmitting side packet line card 10 multiplexes the STS1 frame format data in a predetermined time slot, a stage in which the main TSI section 50 performs allocation for each time slot and a stage in which the local TSI section 21 of the receiving side packet line card 20 separates data from a predetermined time slot as a specific packet. Here, the main packet control section 60, the local packet control section 13 and the receiving side local packet control section 23 communicate with each other and perform circuit settings so that an IP packet transmitted to a certain port of the transmitting side packet line card 10 is outputted to a port of the target receiving side packet line card 20.

Next, the control flow by the main packet control section 60, the local packet control section 13 and the receiving side local packet control section 23 will be explained.

Figure 8:
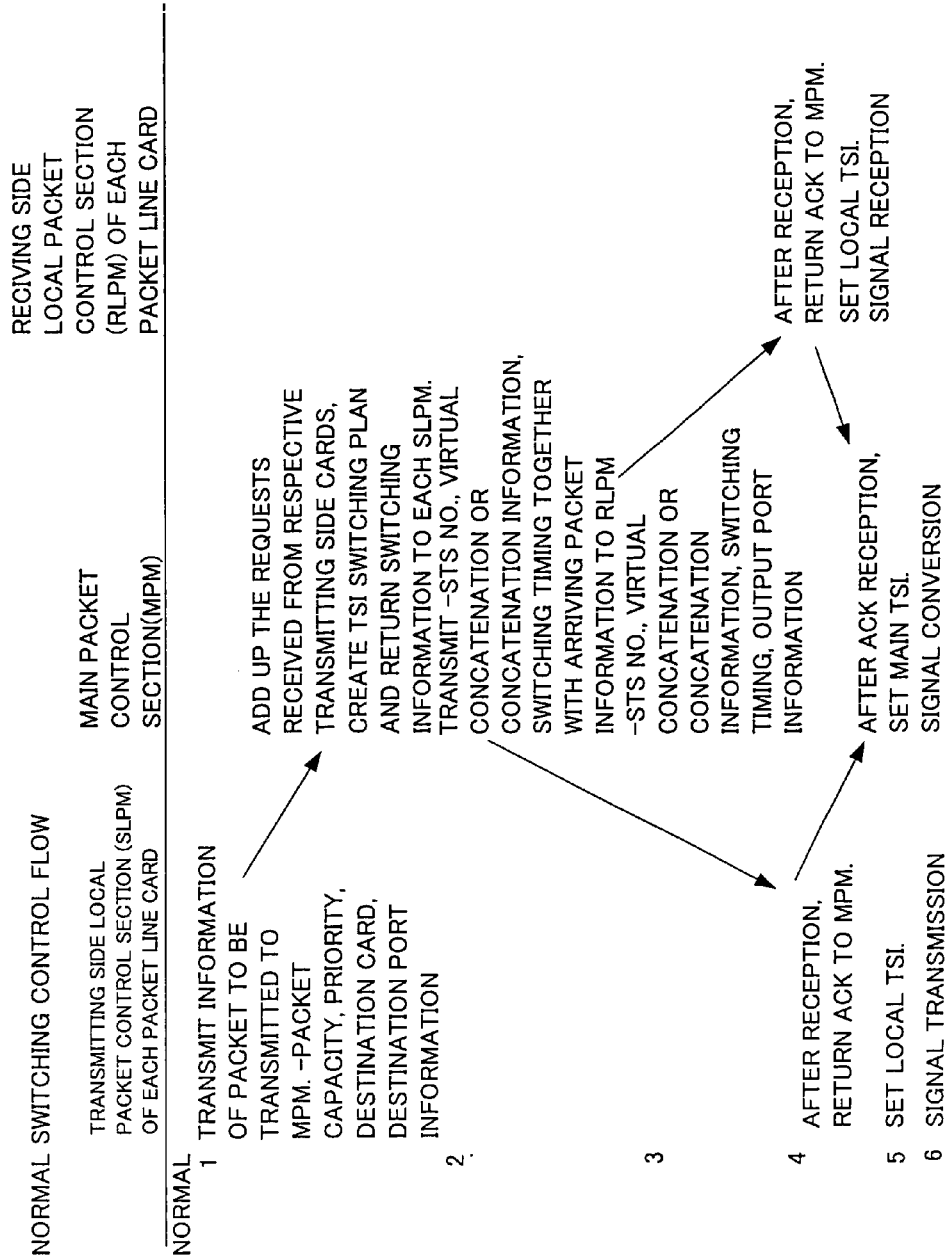
FIG. 8 is a chart showing a control flow of normal switching.

FIG. 8 is a chart showing a control flow of normal switching.

FIG. 8 shows an overview of procedure for control by the main packet control section 60 (Main Packet Management Section, hereinafter abbreviated as "MPM 60"), the local packet control section 13 (Sending Local Packet Management, hereinafter abbreviated as "SLPM 13") of the transmitting side packet line card 10 and the receiving side local packet control section 23 (Receiving Local Packet Management, hereinafter abbreviated as "RLPM 23") of the receiving side packet line card 20 from step 1 to step 6 in a chronological sequence. In the case of normal switching which sends data from the transmitting side packet line card 10a to the receiving side packet line card 20a, the SLPM 13 receives the packet information of the IP packet sent through Ethernet from the packet processing section 112 (see FIG. 2) and transmits it to the MPM 60 as a transmission request in step 1 first. This packet information includes packet capacity, packet priority, destination card information indicating the receiving side packet line card 20 determined by the packet processing section 112 with reference to a routing table and destination port information indicating a specific receiving side Ethernet IF 224 in the destination card. Packet information is transmitted to the MPM 60 also from the transmitting side packet line cards 10b and 10c other than the transmitting side packet line card 10a.

Next, in step 2, the MPM 60 creates a TSI switching plan by adding up the packet information received from the transmitting side packet line cards 10. The TSI switching plan includes the number of an STS frame to which each packet is mapped, information on the continuous concatenation or virtual concatenation, switching information such as switching timing which is multiplexing timing. The MPM 60 transmits the created TSI switching information to the SLPM 13. Furthermore, in next step 3, the MPM 60 transmits the created TSI switching information to RLPM 23, too. The destination port information is also transmitted to the RLPM 23 together.

Upon receiving the switching information from the MPM 60 in next step 4, the SLPM 13 returns an Ack signal to the MPM 60. Upon receiving the switching information from the MPM 60, the RLPM 23 also returns an Ack signal to the MPM 60.

Upon receiving the Ack signals from SLPM 13 and RLPM 23, the MPM 60 sets the main TSI section 50 based on the TSI switching plan. Furthermore, the SLPM 13 sets the local TSI section 12 so as to multiplex the data converted to the GFP frame format based on the received TSI switching information. On the other hand, the RLPM 23 separates the multiplexed data based on the received TSI switching information, converts it to an IP packet format and sets the local TSI section 21 so as to be outputted from the receiving side Ethernet IF 224 which corresponds to the identified port (step 5).

In next step 6, the transmitting side packet line card 10 transmits the multiplexed data to the main TSI section 50 and the main TSI section 50 distributes the multiplexed data to each receiving side packet line card 20 according to the time slot to thereby perform switching, and the receiving side packet line card 20 separates the multiplexed data sent from the main TSI section 50, converts it to IP packet format data and outputs it from a predetermined receiving side Ethernet IF 224.

Next, the control flow in the event of a fault at normal switching will be explained.

Figure 9:
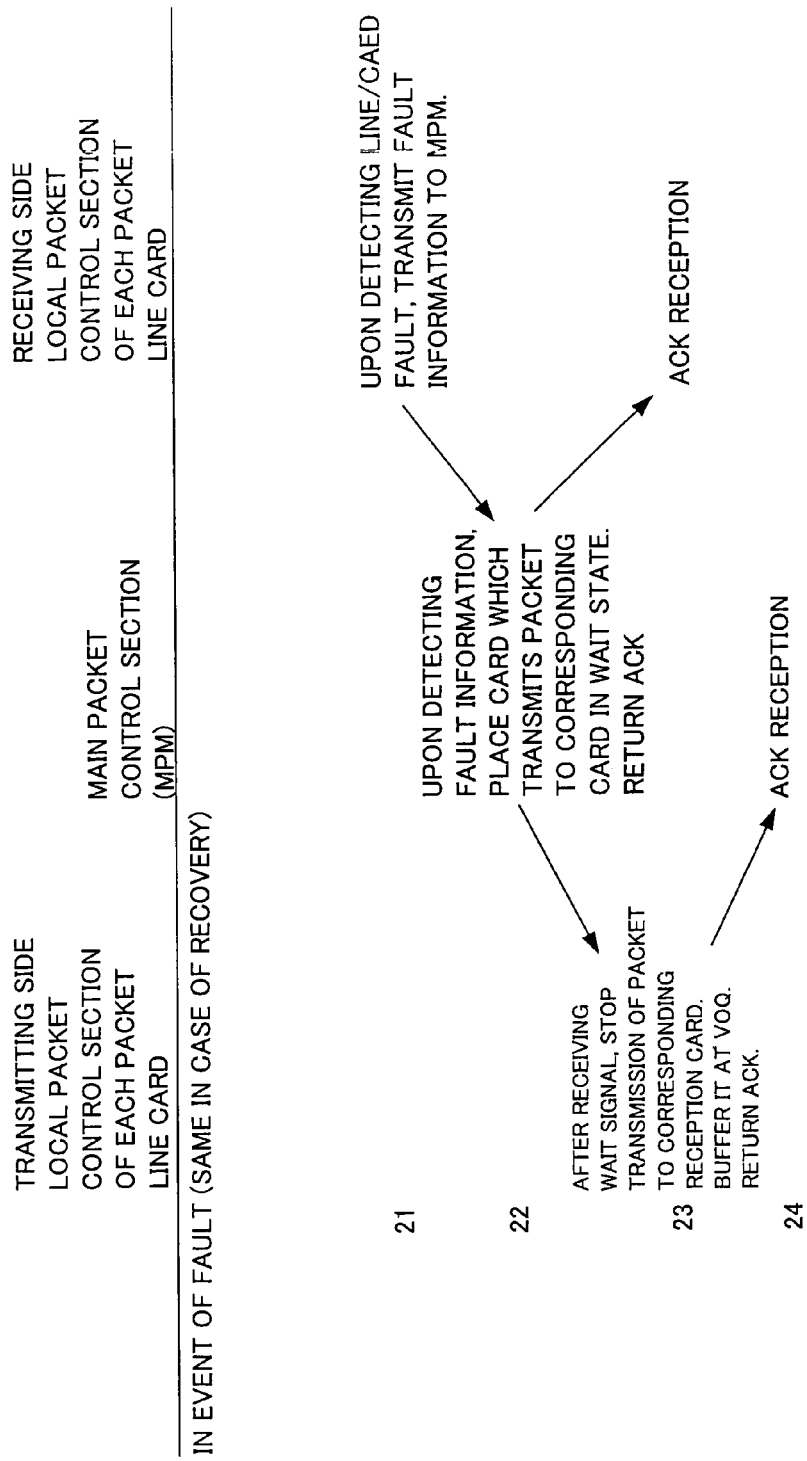
FIG. 9 is a chart showing a control flow of the normal switching in the event of a fault.

FIG. 9 is a chart showing a control flow of normal switching in the event of a fault.

FIG. 9 shows an overview of procedure for control by the MPM 60, SLPM 13 and RLPM 23 from step 21 to step 24. In step 21, for example, when the RLPM 23 of the receiving side packet line card 20a detects a fault in the receiving side packet line card 20a, it transmits fault information to the MPM 60.

In next step 22, upon receiving the fault information, the MPM 60 transmits a wait signal to the SLPM 13 of the transmitting side packet line card 10 which is transmitting the data to be transmitted to the receiving side packet line card 20a to the main TSI section 50 based on the TSI switching plan. Furthermore, the MPM 60 transmits an Ack signal to the RLPM 23.

In step 23, upon receiving the wait signal, the SLPM 13 stops transmission of the data transmitted to the receiving side packet line card 20a in which the fault has occurred and returns an Ack signal to the MPM 60. At this time, the data which is not transmitted is buffered in a virtual output queue which is one of the multiple buffers 114 in the IP packet format. After recovery from the fault, the data buffered in the virtual output queue is transmitted to the main TSI section 50 and reaches the target receiving side packet line card 20a and data dropout is thereby prevented. Here, the SLPM 13, RLPM 23 and MPM 60 which execute the control flow when the fault occurs correspond to an example of the fault handling control section described in the invention.

Next, a control flow in the high-speed switching mode will be explained.

Figure 10:
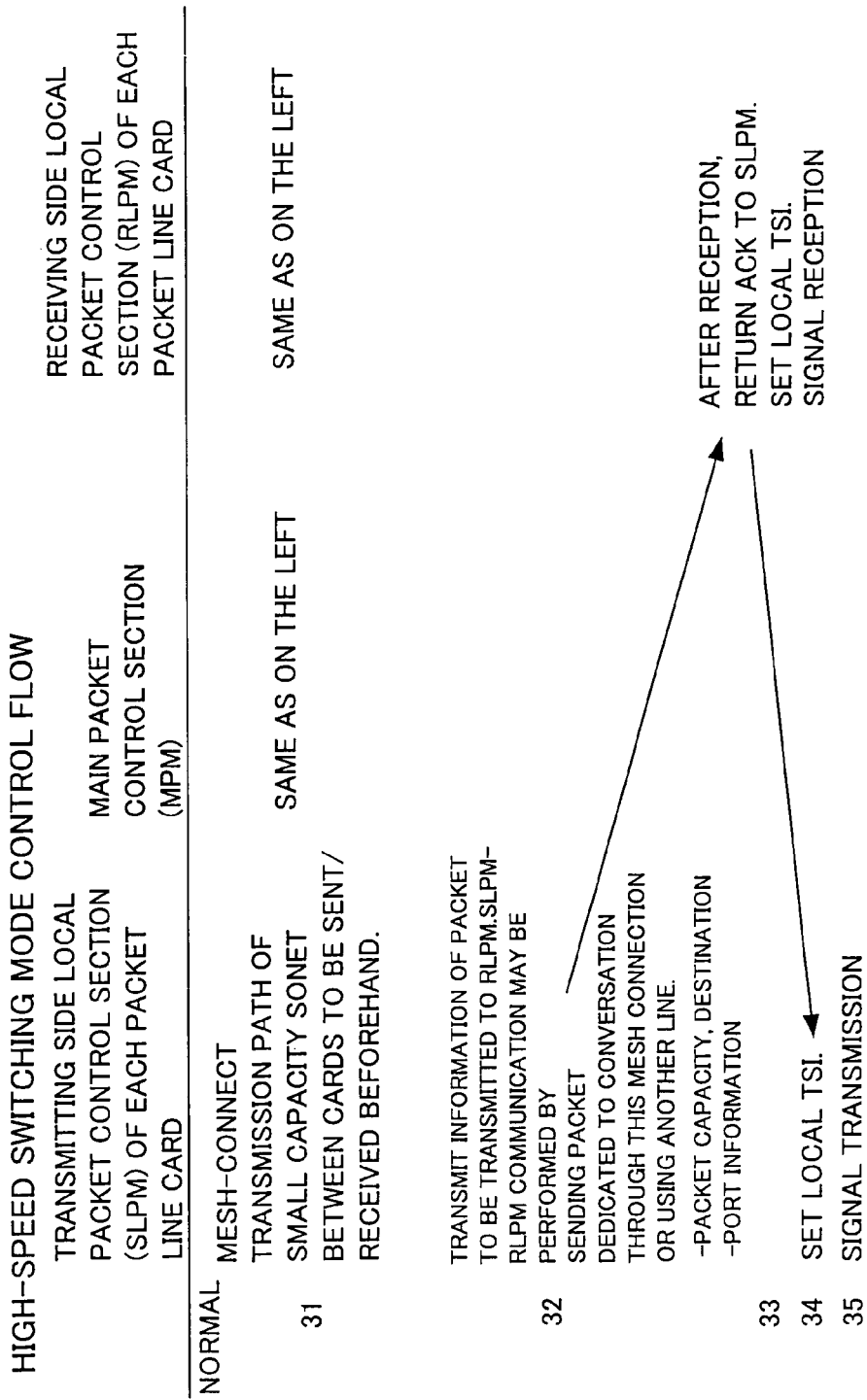
FIG. 10 is a chart showing a control flow of a high-speed switching.

FIG. 10 is a chart showing the control flow of high-speed switching.

FIG. 10 shows an overview of procedure for control by the MPM 60, SLPM 13 and RLPM 23 from step 31 to step 35. In the high-speed switching mode, each of the SLPM 13, MPM 60 and RLPM 23 sets the local TSI section 12, main TSI section 50 and local TSI section 21 so that a mesh connection is applied to small capacity transmission paths between each transmitting side packet line card 10 and each receiving side packet line card 20 (step 31).

Figure 11:
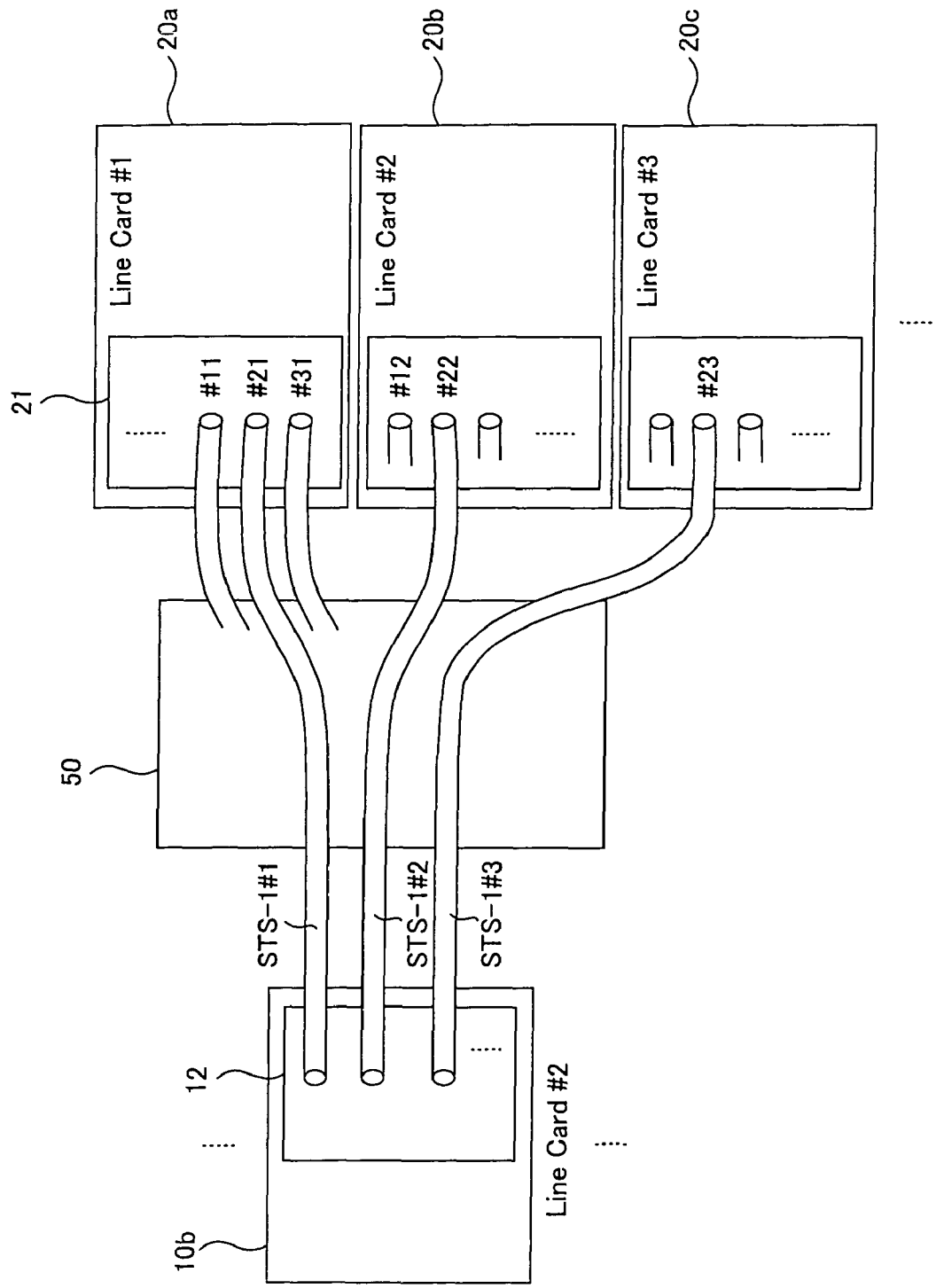
FIG. 11 illustrates a mesh connection in the high-speed switching.

FIG. 11 illustrates the mesh connection in the high-speed switching mode.

The mesh connection is a connection whereby multiple logical data paths are arranged like mesh. For example, multiple types of IP packet format data are multiplexed in the SONET/SDH frame in the transmitting side packet line card 10b shown in FIG. 11 and multiple logical data paths STS-1#1, STS-1#2, STS-1#3, . . . are thereby formed. In the mesh connection, all receiving side packet line cards 20 always correspond to any one of the logical data paths which start from one transmitting side packet line card 10. For example, the logical data path STS-1#1 of the transmitting side packet line card 10b is connected to the receiving side packet line card 20a, the logical data path STS1#2 is connected to the receiving side packet line card 20b and the logical data path STS-1#3 is connected to the receiving side packet line card 20c. In high-speed switching, the MPM 60 is fixed to the mesh connection setting, and therefore the transmitting side packet line card 10 selects any one of the multiple logical data paths STS-1 through which data is transmitted, and can thereby select the receiving side packet line card 20 which receives this data.

Returning to FIG. 10 to continue the explanation, the SLPM 13 transmits the packet information of a packet to be transmitted to the RLPM 23 in step 32. This packet information includes packet capacity and destination port information. The packet information is transmitted using packets dedicated to conversations among the control sections. More specifically, when the SLPM 13 transmits a packet which has the above packet information to the SONET mapper/framer 117 by specifying a specific logical data path (the path indicated by solid line between the SLPM 13 and the SONET mapper/framer 117 in FIG. 2), this packet information is transmitted via the local TSI section 12 and main TSI section 50 and is further transmitted to the RLPM 23 via the local TSI section 21 of the specific receiving side packet line card 20 and SONET demapper 221. The RLPM 23 returns an Ack signal to the SLPM 13 in next step 33.

In next step 34, the SLPM 13 sets the local TSI section 12. This setting causes the local TSI section 12 to multiplex the data converted to the GFP frame format as the STS-1#3 frame so as to be transferred via the logical data path STS-1#3 which corresponds to the receiving side packet line card 20c. On the other hand, the RLPM 23 sets the local TSI section 21. With this setting, the local TSI section 21 separates the data sent via the logical data path STS-1#3 so as to be outputted from the receiving side Ethernet IF 224 according to the destination port information received in step 32.

In next step 35, the data outputted from the local TSI section 12 is transmitted to the receiving side packet line card 20c via the logical data path STS-1#3 and is outputted from the receiving side Ethernet IF 224 according to the destination port information.

In the high-speed switching mode, the distribution of logical data paths in the main TSI section 50 is fixed and the local TSI section 12 selects a logical data path through which data is transferred. Therefore, because switching setting is not dynamically changed in the main TSI section 50, it is possible to increase the data transmission rate.

Figure 12:
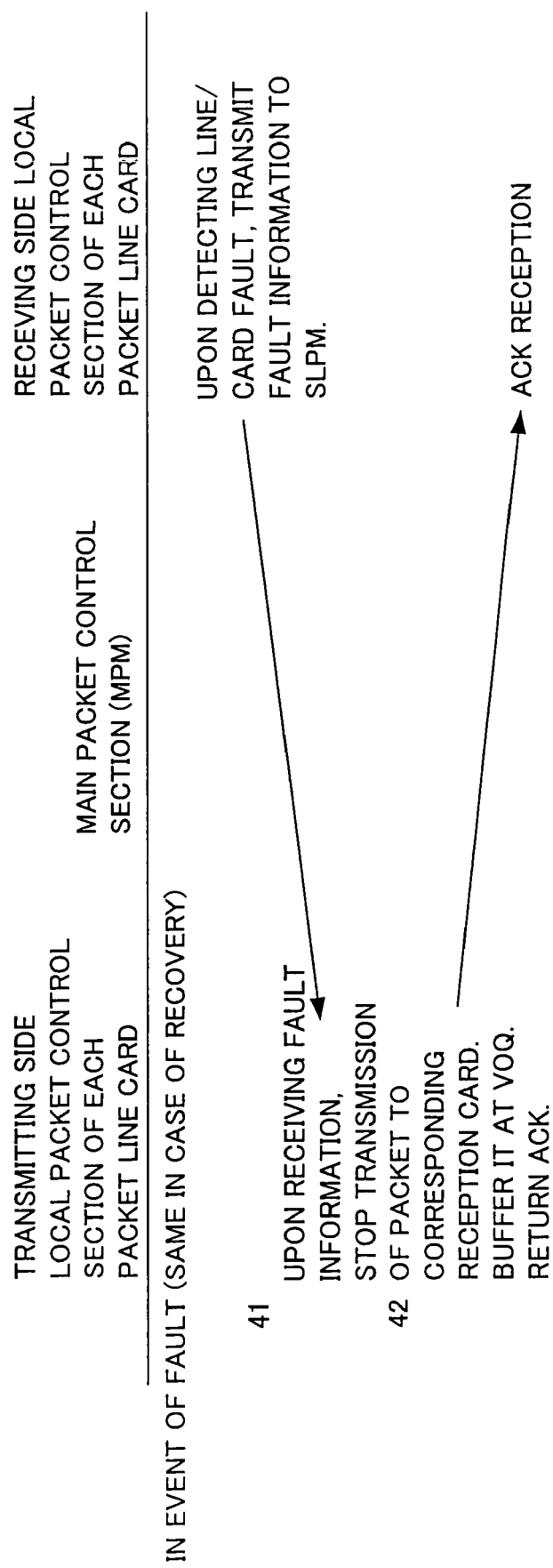
FIG. 12 is a chart showing a control flow of the high-speed switch in the event of a fault.

FIG. 12 is a chart showing the control flow of the high-speed switching in the event of a fault.

FIG. 12 shows an overview of procedure for control by the MPM 60, SLPM 13 and RLPM 23 in step 41 and step 42. For example, when the RLPM 23 of the receiving side packet line card 20a detects a fault and transmits fault information to the SLPM 13 (step 41), the SLPM 13 returns an Ack signal and stops transmission of the data transmitted to the receiving side packet line card 20a in which the fault has occurred and causes data to be buffered in a virtual output queue (step 42).

Next, a control flow in a multicast switching mode will be explained.

Figure 13:
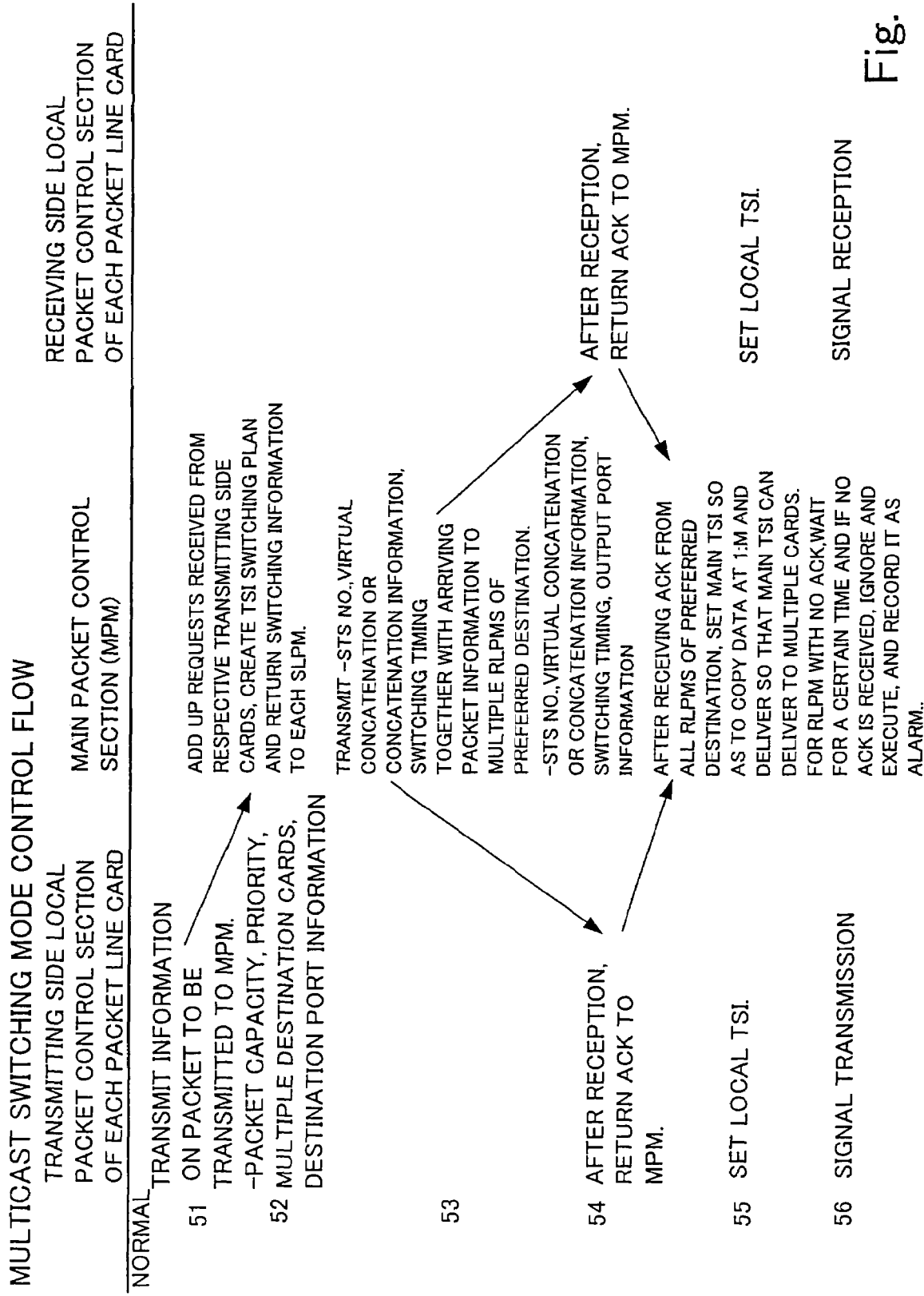
FIG. 13 is a chart showing a control flow of a multicast switch.

FIG. 13 is a chart showing the control flow of multicast switching.

FIG. 13 shows an overview of procedure for control by the MPM 60, SLPM 13 and RLPM 23 from step 51 to step 56. In the multicast switching mode, the information indicating the destination of data is set for multiple destinations.

Figure 14:
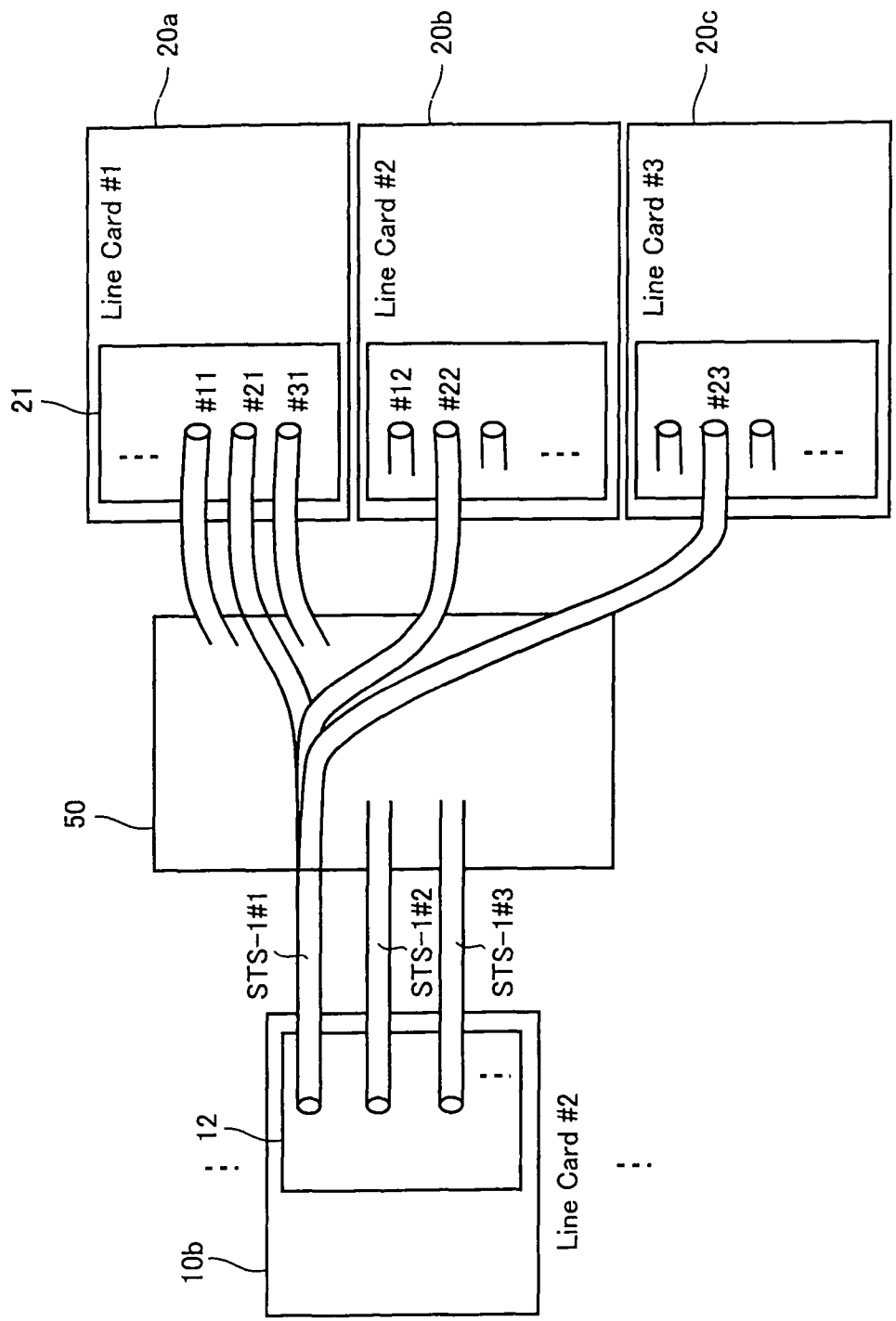
FIG. 14 illustrates a multicast connection.

FIG. 14 illustrates connections in multicasting.

FIG. 14 shows an example of multicasting (SONET multicasting) at the payload level of the SONET/SDH frame. In this multicasting, one type of data which is transferred via a specific logical data path is duplicated by the main TSI section 50 and is also transferred via a logical data path which is different from the above logical data path and is transmitted to multiple locations. In the example shown in FIG. 14, the main TSI section 50 transmits the data transmitted via the logical data path STS-1#1 of the transmitting side packet line card 10b to the receiving side packet line card 20a and duplicates this data, transmits the data via the logical data path STS-1#2 and logical data path STS-1#3 and also transmits it to the receiving side packet line card 20b and receiving side packet line card 20c. In this way, multicasting at the payload level of the SONET/SDH frame is realized.

Returning to FIG. 13 to continue the explanation, the SLPM 13 transmits the packet information of the IP packet sent through Ethernet to the MPM 60 in step 51 first. This packet information is similar to the packet information in the case of normal switching in FIG. 8 except that the destination card information indicating multiple receiving side packet line cards 20 or multiple pieces of destination port information.

Next, in step 52, the MPM 60 creates a TSI switching plan. The TSI switching plan includes switching information such as the number of an STS frame to which each packet is mapped, information on continuous concatenation or virtual concatenation, switching timing at which data is multiplexed.

The MPM 60 transmits TSI switching information to the SLPM 13. In next step 53, the MPM 60 transmits the TSI switching information created to multiple RLPMs 23 in the multiple receiving side packet line cards 20 in which multicasting is performed.

The SLPM 13 receives the switching information from the MPM 60 and then returns an Ack signal to the MPM 60 in next step 54. Furthermore, the multiple RLPMs 23 which have received the switching information also return Ack signals to the MPM 60 (step 54).

Upon receiving the Ack signals from the SLPM 13 and the RLPM 23, the MPM 60 sets the main TSI section 50 based on the TSI switching plan (step 55). Here, the MPM 60 sets the main TSI section 50 so as to duplicate the data to be multicast at 1:m and then deliver it. In the example shown in FIG. 14, such a setting is made that out of the multiple multiplexed SONET frames transmitted from the transmitting side packet line card 10b, the frame of the STS-1#1 is duplicated at 1:3 as STS-1#2 and STS-1#3 and a real so transmitted to the receiving side packet line cards 20b and 20c. In step 53, out of the multiple RLPMs 23 which have transmitted switching information, an RLPM 23 which does not return any Ack signal within a certain time is assumed to be in trouble, duplication and transmission of the data are ignored and the trouble is recorded as a warning target later.

In next step 56, the transmitting side packet line card 10 transmits the multiplexed data which forms multiple logical data paths to the main TSI section 50 and the main TSI section 50 duplicates data to be transferred via one logical data path and distributes the data to the receiving side packet line card 20.

Figure 15:
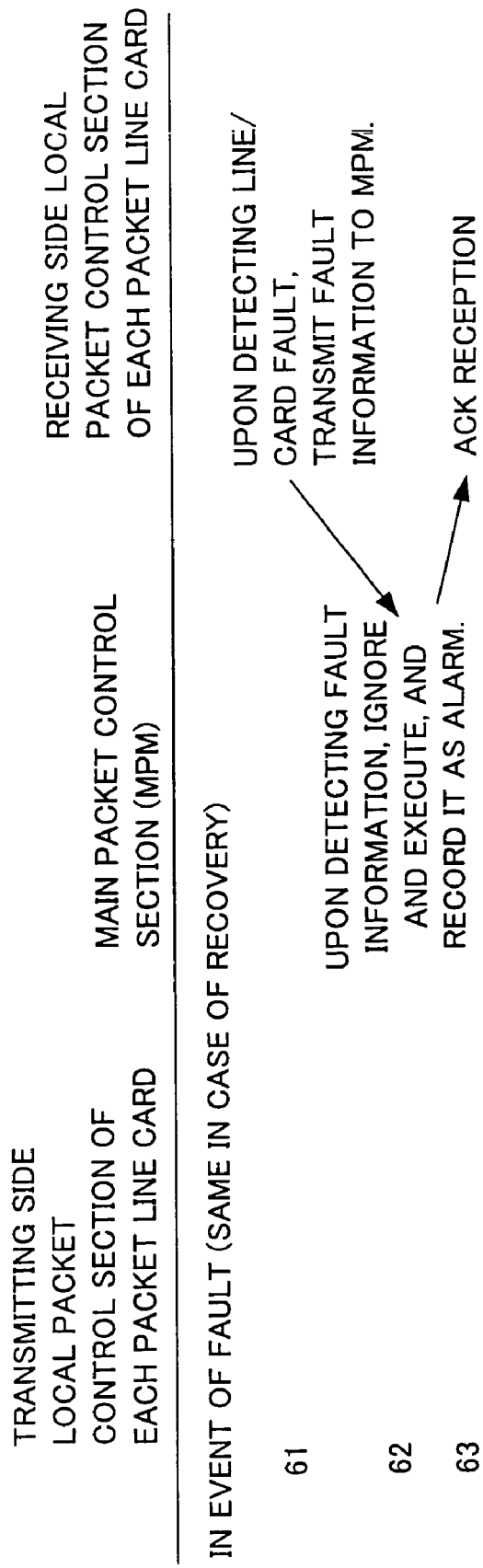
FIG. 15 is a chart showing a control flow of the multicast switch in the event of a fault.
Figure 16:
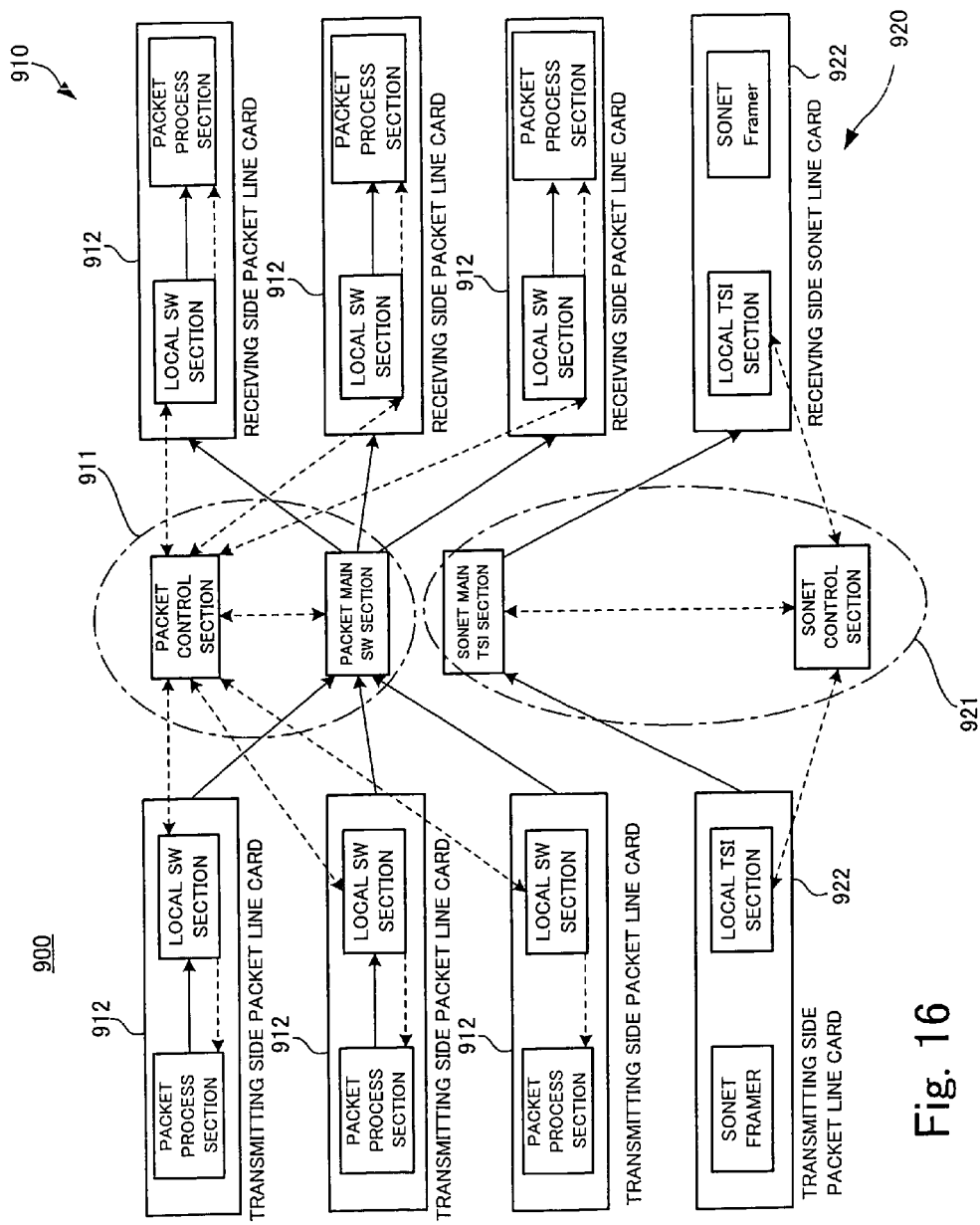
FIG. 16 is a block diagram showing a configuration of a conventional transmission apparatus.

FIG. 15 is a chart showing the control flow of multicast switching in the event of a fault.

FIG. 15 shows an overview of procedure for control by the MPM 60, SLPM 13 and RLPM 23 from step 61 to step 63. For example, when detecting a fault, the RLPM 23 of the receiving side packet line card 20a transmits fault information to the MPM 60 (step 61). Upon receiving the fault information, the MPM 60 assumes that the receiving side packet line card 20a is in trouble, ignores data duplication and transmission of the receiving side packet line card 20a and records the trouble as a warning target later. Even in this case, data transmission is continued for the other receiving side packet line cards 20b and 20c which are transmitting data by multicasting.

The multicasting (SONET multicasting) by the main TSI section 50 at the payload level of the SONET/SDH frame has been explained in FIG. 14 and FIG. 13, and now, packet level multicasting realized by duplication of an IP packet will be explained.

In packet level multicasting, the operations of the main TSI section 50 and the receiving side packet line card 20 are the same as those of normal switching and the control flow is also similar to that of the normal switching explained with reference to FIG. 8. This will be explained with reference to FIG. 2. In the packet level multicasting, the reading section 115 of the transmitting side packet line card 10 duplicates IP packet format data read from one buffer 114 out of the multiple buffers 114 and processes the data as multiple IP packets. In this way, multicast processing is performed for each IP packet.

As explained above, in the transmission apparatus 1 of this embodiment, the GFP framing section 116 converts packet format data to variable length frame format data, and then the SONET mapper/framer 117 converts the data to SONET/SDH basic frame format data. Therefore, transmission loss is suppressed compared to the configuration whereby packet format data is subdivided into fixed length frames.

Of SONET/SDH, this embodiment has mainly explained the frame format defined by SONET, but the transmission apparatus according to the invention is not limited to this and is also applicable to SDH which has a frame configuration similar to that of SONET.

Furthermore, an IP packet has been explained as the packet format handled by the transmission apparatus according to this embodiment, but the transmission apparatus according to the invention is not limited to this, and as an example of packet format, the transmission apparatus may also handle an Ethernet frame as a packet.

Furthermore, this embodiment has explained examples of multiple transmitting side packet line cards 10 and receiving side packet line cards 20 as the interfaces connected to an asynchronous network, but the line interfaces of the invention are not limited to those formed into cards, and can also be formed on a common card or on the contrary, those interfaces may also be further subdivided into multiple cards.

What is claimed is:

1. A transmission apparatus which accommodates a plurality of asynchronous networks and SONET/SDH networks, comprising:
   a plurality of transmitting side line interfaces which convert packet format data sent from the asynchronous networks to a SONET/SDH frame format which is a time division multiplexing frame format and then transmit the data;
   a plurality of receiving side line interfaces which receive the SONET/SDH frame format data and convert at least part of the received data to packet format data;
   a SONET/SDH network interface which relays the SONET/SDH network; and
   a circuit switching section which sends and receives SONET/SDH frame format data between the SONET/SDH network interface, the plurality of transmitting side line interfaces and the plurality of receiving side line interfaces and switches circuits between the SONET/SDH network interface, the plurality of transmitting side line interfaces and the plurality of receiving side line interfaces based on a predetermined circuit setting, wherein the circuit switching section duplicates at least one type of data out of a plurality of types of data multiplexed in a SONET/SDH frame and transmits the duplicated data to a predetermined number of receiving side line interfaces according to a predetermined circuit setting out of the plurality of receiving side line interfaces, and if a fault occurs in one of the predetermined number of receiving side line interfaces, the circuit switching section stops duplicating and transmitting for the one of the predetermined number of receiving side line interfaces and continues duplicating and transmitting for remaining receiving side line interfaces of the predetermined number of receiving side line interfaces.

2. The transmission apparatus according to claim 1, wherein the circuit switching section is set to a mesh connection in which a plurality of logical data paths which are formed when a plurality of types of data are multiplexed in a SONET/SDH frame at each of the plurality of transmitting side line interfaces are distributed to the plurality of receiving side line interfaces, and
   each of the plurality of transmitting side line interfaces selects a logical data path through which data is transferred out of the plurality of logical data paths so as to select a receiving side line interface which receives the data out of the plurality of receiving side line interfaces.

3. The transmission apparatus according to claim 1, wherein each of the plurality of transmitting side line interfaces comprises:

a variable length frame mapping section which converts packet format data to variable length frame format data that has a data format which is different from the SONET/SDH frame format and from a packet format of the packet format data; and a time division multiplexing mapping section which converts the variable length frame format data converted by the variable length frame mapping section to the SONET/SDH frame format data, and each of the plurality of receiving side line interfaces comprises:

a variable length frame demapping section which reconverts the SONET/SDH frame format data to variable length frame format data; and a packet data configuration section which converts the variable length frame format data reconverted by the variable length frame conversion section to packet format data.

4. The transmission apparatus according to claim 3, wherein each of the plurality of transmitting side line interfaces comprises:

a plurality of buffers which buffer the data sent in the packet format for each type of the data; and a reading section which reads data with a frequency according to each buffer from the plurality of buffers and supplies the data to the variable length frame mapping section.

5. The transmission apparatus according to claim 4, further comprising a fault handling control section which causes, when a fault occurs in any one of the plurality of receiving side line interfaces, the transmitting side line interface which converts the data transmitted to the receiving side line interface in which the fault has occurred out of the plurality of transmitting side line interfaces to stop data conversion to the SONET/SDH frame format and buffer the packet format data sent to the transmitting side line interface.

6. The transmission apparatus according to claim 4, wherein the reading section reads data from the plurality of buffers according to a schedule using a weighted round robin method in which data is read with a higher frequency from a buffer with higher priority assigned.

7. The transmission apparatus according to claim 6, wherein the reading section reads data by giving first priority to a buffer which buffers voice data out of the plurality of buffers.

8. The transmission apparatus according to claim 3, wherein the variable length frame mapping section converts packet format data to GFP frame format data defined by the ITU Recommendation G.7041 as a variable length frame format.

* * * * *